Nov. 26, 1968  R. E. BUCK  3,413,010
MECHANICAL DEVICE
Filed Jan. 20, 1966  2 Sheets-Sheet 1
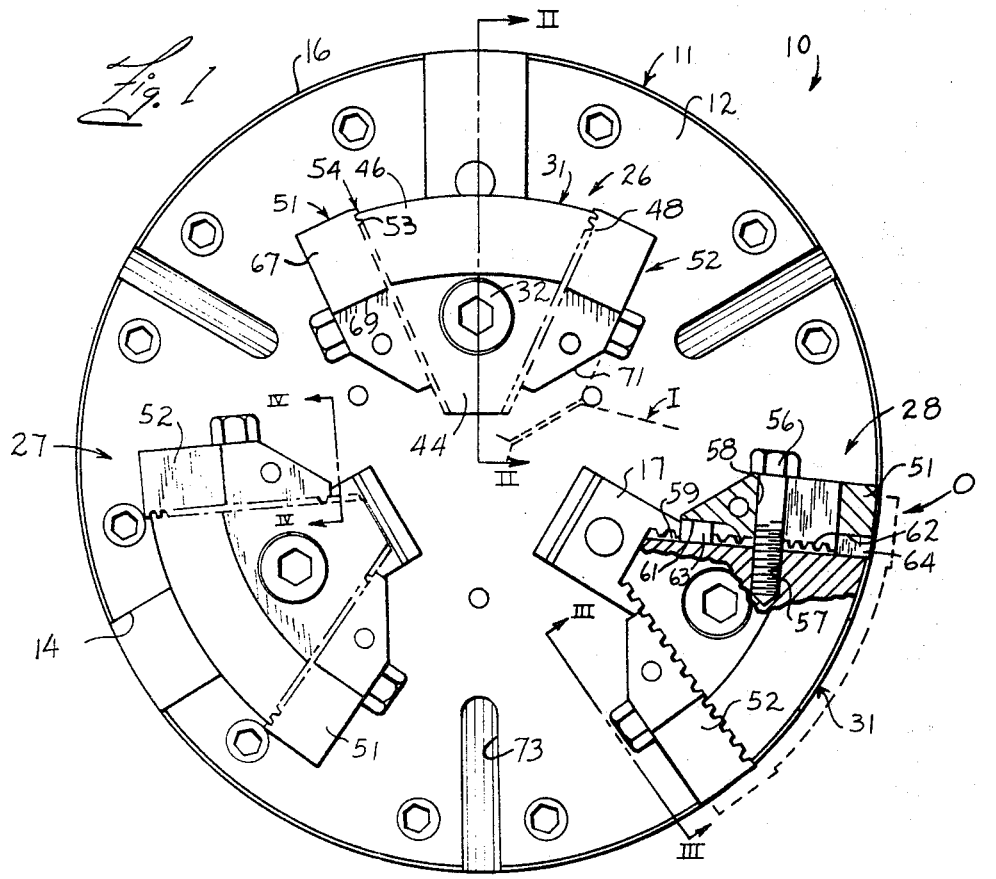
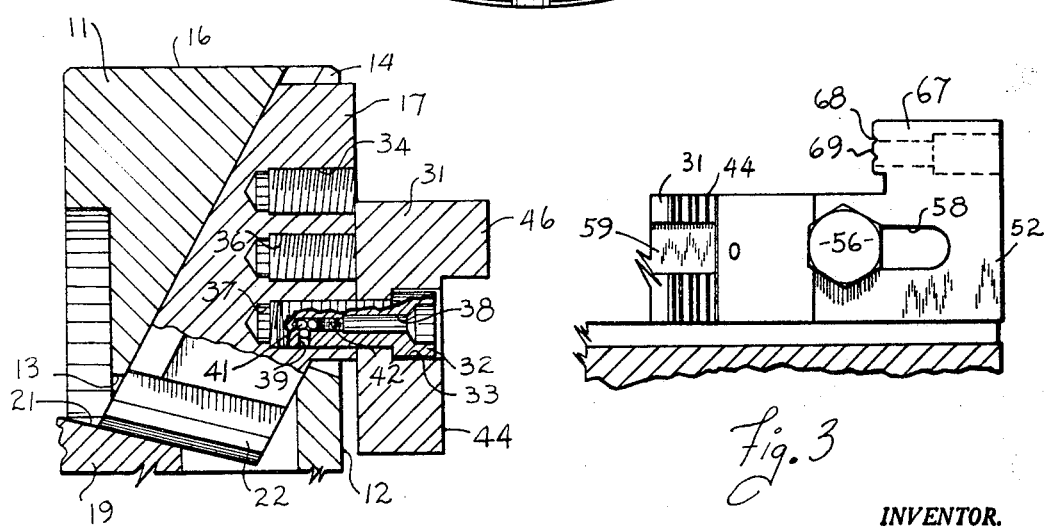
INVENTOR.
RUSSELL E. BUCK
BY Woodhams, Blanchard & Flynn
ATTORNEYS

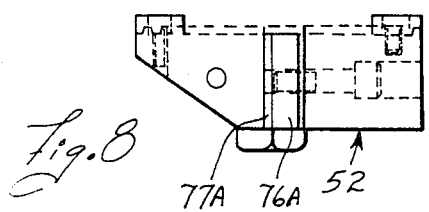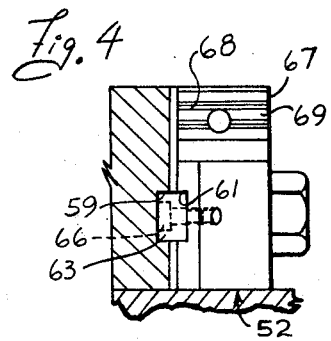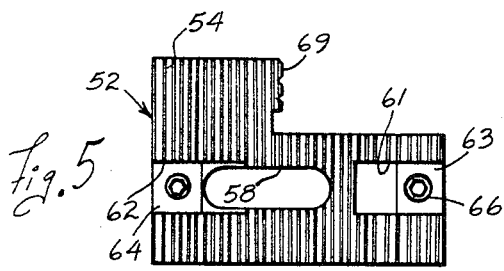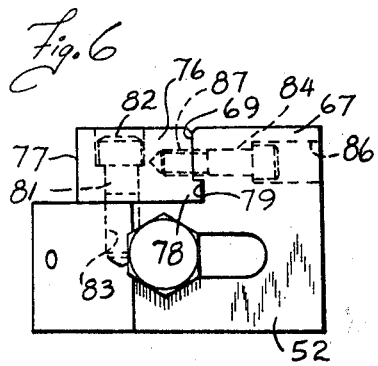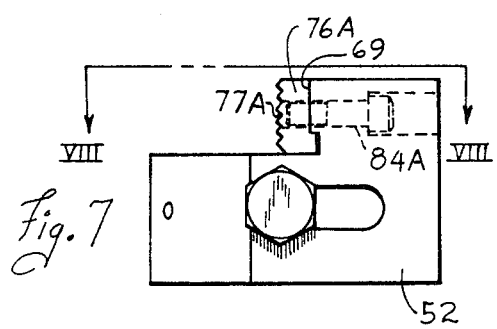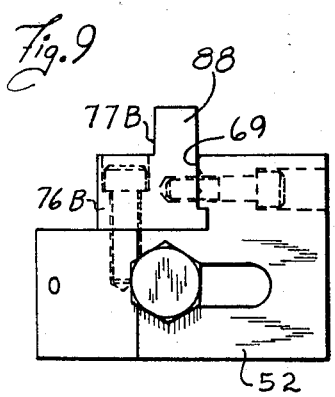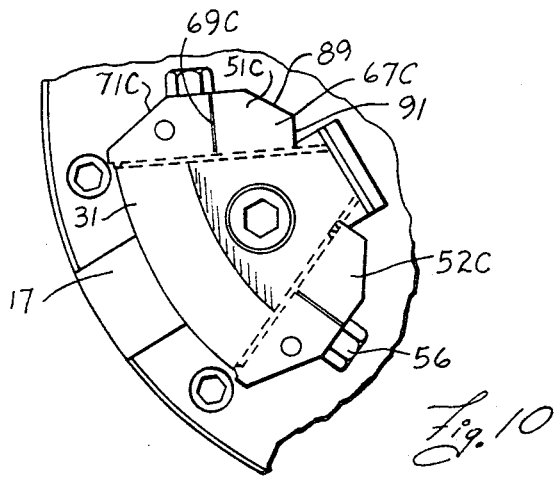

United States Patent Office 3,413,010
Patented Nov. 26, 1968

3,413,010
MECHANICAL DEVICE
Russell E. Buck, Scotts, Mich., assignor to Buck Tool Company, Kalamazoo, Mich., a corporation of Michigan
Filed Jan. 20, 1966, Ser. No. 521,873
8 Claims. (Cl. 279—121)

ABSTRACT OF THE DISCLOSURE

A chuck construction having a plurality of jaw carriers slideably mounted thereon. Each jaw carrier has a central member pivotally mounted thereon having a pair of work-engaging shoes on opposite lateral sides thereof. Each of the shoes is movable radially along the sidewall of the central member to allow for a fine adjustment in the position thereof. Similarly, each of the central members is adjustably positioned radially on the jaw carrier to allow for a course adjustment in the position thereof.

---

This invention relates to a chuck construction and more particularly relates to a power chuck having workpiece-engaging pads mounted on the sides of the jaws.

Prior power chucks of which I am aware are characterized in having a relatively short range of power operated jaw movement as compared, for example, to the range of jaw movement in comparable manual chucks. While this is no particular problem where the chuck is to be used for only one size of workpiece, workpieces which differ significantly in diameter cannot be gripped by the same chuck.

Prior attempts to solve this problem by providing extra means for enabling a gross adjustment in the radial position of the chuck jaw have in general not been completely satisfactory. One prior approach has been to provide the top of the jaw carrier with two or three circumferentially extending grooves into which are insertable corresponding tongues on the opposed underside of the jaw, the interlocking of the tongues and grooves preventing relative radial movement between the jaw and the carrier. Generally several screws extend through the jaw into threaded holes in the jaw carrier to prevent separation of the jaw and carrier axially of the chuck. Such a system is generally disadvantageous, however, in that the jaw can be located at only a few different places on the jaw carrier since meshing of several screws from the jaw with several threaded openings in the jaw carrier is required to securely hold the jaw and carrier together.

A further prior approach provides a radial keyway in the jaw carrier in which an elongated nut is radially slideably disposed. The front face of the carrier is provided with close spaced transverse serrations. A key member is serrated on its rearward face for engaging the serrations on the carrier opposite the nut. A jaw is transversely grooved on its rear face for receiving the key and is held against the forward face of the jaw carrier by a pair of screws threadedly engaging the ends of the nut. To resist radial shear forces, the key and its groove in the jaw must be relatively large radially. As a result, the key and jaw in practice occupy only one relative position. Thus, the jaw can be adjusted radially of the carrier only by adjusting the key radially along the carrier. To resist shear forces, the key must cover a substantial fraction of the carrier serrations so that the key can be shifted only through a fraction of the serrated length of the carrier. In consequence, the range of jaw adjustment on the carrier is relatively small.

Another prior approach has been to use only a single screw to secure the jaw to the jaw carrier. However, this too has disadvantages in the prior constructions in which it has been used. More specifically, to withstand rocking torques disposed on the jaw carrier as workpieces are chucked, the single screw must be substantially larger in cross section than the screws used in multiple screw jaw carrier connections. Thus in conventional narrow prior jaws and jaw carriers, sufficient screw tensile strength and sufficient wall thickness around the screw are competing needs. Further, conventional jaws secured to jaw carriers by single screws tend to pivot around the screw away from the workpiece on contact therewith, often necessitating extra holding devices interposed between the jaw and carrier, to overcome this pivoting tendency.

Conventional single screw jaws are further disadvantageous in that it is economically feasible to provide only a few adjustment steps. More particularly, radial shear forces exerted on the jaw are generally resisted by interfitting tongues and grooves in the opposed surfaces of the jaw and jaw carrier, respectively, which tongues and grooves are relatively deep and radially thick to provide adequate shear strength. Thus, there is room for only a few such tongues and grooves on a conventional jaw, which limits the number of adjustment steps and the fineness of the adjustment of jaw position. Moreover, the number of relative locations of chuck carrier and jaw in a radial direction has been further limited by the relatively great diameter of the screw and of the corresponding screw holes in the jaw and jaw carrier and by the necessity of providing a moderate wall thickness between the threaded screw holes in the jaw carrier.

In practice, therefore the number of positions in which the jaw may be mounted on the jaw carrier may be limited to as few as two or three relatively widely spaced positions. In particularly heavy-duty power chucks where the working parts are large relative to the diameter of the chuck, the distance between two adjacent jaw positions on the jaw carrier may substantially exceed the powered radial travel of the jaw carrier thus leaving blank spots in the range workpiece diameters that can be gripped by the chuck. In such cases, it has often been the practice to provide one or more alternative sets of jaws for the chuck construction in which the screw holes are located differently so that if a workpiece cannot be gripped by one set of jaws, such set of jaws is replaced by another set capable of gripping diameter ranges. Purchasing and maintaining several sets of jaws for a single chuck is highly disadvantageous from the standpoint of cost to the user.

Prior art chucks are also known in which adjustment devices are disposed on the front radial face of the jaws to provide for adjustment thereof. However, this greatly increases the axial overhang of the jaws and thereby of the chuck and is disadvantageous for a number of widely well understood reasons.

Accordingly, it is an object of this invention to provide a chuck construction in which the jaws can be adjusted radially of the chuck through a range substantially exceeding the range of radial power actuation thereof, in which the jaws will be capable of gripping workpieces of widely varying diameter without replacement and in which the range of capable workpiece diameters is a continuous one free of interruptions.

A further object of the invention is to provide a chuck construction, as aforesaid, in which the jaw is mounted on the jaw carrier with a single screw but which does not tend to pivot its work-engaging face away from a workpiece during chucking thereof but rather is stable in a radially aligned position when engaging a workpiece and in which the jaw need not be keyed to the jaw carrier to prevent radial plane pivoting of the jaw.

A further object is to provide a chuck construction, as aforesaid, in which radial adjustment of the work-engaging portion of the jaw may be accomplished without power actuation of the jaw carrier or shifting the jaw-jaw carrier screw radially along the jaw or carrier.

A further object is to provide a chuck jaw construction for a power chuck which provides a substantial wall thickness about screws used to secure same to the jaw carrier.

A further object is to provide a chuck construction, as aforesaid, in which the jaws each comprise a central member mounted on the carrier and further members supported on the central member for providing work-engaging surfaces and in which means are provided which supply a large plurality of small adjustment steps of the radial position of the work-engaging surfaces with respect to said central member, such steps being small fractions of the spacing of the screw receiving openings in the jaw carrier for receiving the single screw.

A further object is to provide a chuck construction, as aforesaid, in which only a single set of jaws is required to achieve a full and continuous range of adjustment of the radial location of the work-engaging jaw surfaces.

A further object is to provide a chuck construction, as aforesaid, in which the axial overhanging of the chuck jaws is substantially the same as conventional chuck jaws of the one-piece type.

A further object is to provide a chuck jaw construction, as aforesaid, in which the work-engaging members are mounted on the circumferentially facing sides of the central member, in which the manual fine adjustment of work-engaging surface location is made by radial movement of the work-engaging members on the central member and in which the range of workpiece diameters which can be gripped can be extended beyond the normal range of manual adjustment between the central member and the work-engaging members without recourse to moving the jaw relatively to the jaw carrier by moving the work-engaging members to opposite sides of the central member and reversing the radial orientation thereof.

A further object is to provide a jaw construction, as aforesaid, in which the shear force occuring between the central member and each of the work-engaging members is for a given total holding force on the workpiece only one-half the force which normally occurs along the adjustment interface between a conventional jaw and carrier.

A further object is to provide a chuck construction, as aforesaid, which will be relatively inexpensive and easy to fabricate, which except for the jaws may utilize substantially conventional components, which will be capable of a long service life under adverse conditions with little or no maintenance and which can be readily maintained by persons acquainted with prior chucks.

A further object is to provide a chuck jaw construction, as aforesaid, which is particularly adapted for use with chucks having carriers movable along inclined paths and which is also fully useable with conventional radially moving carriers.

Other objects and purposes of this invention will be apparent to persons acquainted with apparatus of this general type upon reading the accompanying disclosure and inspecting the accompanying drawings.

FIGURE 1 is a partially broken front elevational view of a chuck embodying the invention.

FIGURE 2 is a sectional view taken on the line II—II of FIGURE 1.

FIGURE 3 is an enlarged, fragmentary sectional view taken on the line III—III of FIGURE 1 and rotated counterclockwise through 90°.

FIGURE 4 is an enlarged, fragmentary sectional view taken on the line IV—IV of FIGURE 1 and rotated clockwise through 90°.

FIGURE 5 shows the reverse face of the member of FIGURE 3.

FIGURE 6 is a fragment of FIGURE 3 showing a modification.

FIGURE 7 is a fragment of FIGURE 3 showing a further modification.

FIGURE 8 is a sectional view taken on the line VIII—VIII of FIGURE 7.

FIGURE 9 is a fragment of FIGURE 3 showing a still further modification.

FIGURE 10 is a fragment of FIGURE 1 showing a modification.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to a direction axially away from the front or work-engaging face of the chuck and to the opposite direction, respectively. The words "inwardly" and "outwardly" will refer to directions toward and away from, respectively, the geometric center of the chuck and designated parts thereof. Said terminology will include the words above specifically mentioned, derivatives thereof and words of similar import.

*General Description*

In general, the objects and purposes of this invention are met by providing a chuck construction comprising a chuck body provided with substantialy radial guideways. A jaw carrier is disposed snugly but slideably in each of the guideways for reciprocation therealong. Suitable means, preferably a power-actuated draw bar, are provided within the chuck body for reciprocating the jaw carriers.

Each of the jaw carriers supports a jaw. Each jaw comprises a generally wedge-shaped, inwardly tapering central member pivotally affixed to the forward face of the jaw carrier by a screw aligned axially of the chuck body. Each central member carries on the tapered side faces thereof a pair of work-engaging members or shoes. The work-engaging members of each jaw are thus circumferentially spaced so that engagement thereof with a workpiece prevents rocking of the jaw. The shoes are adjustable along the side walls of the central members toward and away from the center of the chuck body. The shoes and central members have interengageable teeth extending axially of the chuck body on the opposed faces thereof for preventing unintended radial movement of the shoes on the central members. The teeth are relatively narrow being substantially less wide than the radial travel of the jaw carriers caused by movement of the draw bar, so as to allow adjustment of the shoes on the central members in relatively small steps.

*Detailed description*

The chuck construction 10 embodying the invention includes a generally cylindrical chuck body 11 (FIGURES 1 and 2) having a radial forward wall 12. The chuck body 11 is provided with a rearwardly opening central recess 13. A plurality, here three, of evenly circumferentially spaced slots 14 open through the forward wall 12 and extend from the central recess 13 to the periphery 16 of the chuck body 11. The slots 14 are preferably of generally T-shaped cross section as seen from the center of the chuck and form guideways for preferably identical jaw carriers 17. Although it is contemplated that the jaw carriers 17 may move only radially along the guideways 14, in the particular embodiment shown the guideways have an axial component so that the jaw carriers move axially rearwardly as they move radially inwardly along the guideways 14.

Although the present invention is applicable to known manually operated chucks and to a variety of power chucks, in the particular embodiment shown, the chuck construction 10 is a draw bar actuated power chuck, a type with which the present invention is particularly advantageously used. Thus, the chuck construction 10 is provided with an axially reciprocable draw bar head 19 (FIGURE 2). The draw bar head 19 is provided with an undercut groove 21 opposite each of the jaw carriers 17 which extends rearwardly from the forward end of the draw bar head 19 at a small diverging angle to the chuck axis. The undercut groove 21 slideably receives a generally T-shaped key 22 integral with the inner end of the jaw carrier 17. Thus, rearward movement of the draw bar head 19 results in a radially inward movement of the jaw carrier 17 and forward movement of the draw bar head 19 results in an outward movement of the jaw carrier 17. The portions of the chuck construction 10 which have been described above are substantially similar to corresponding portions of the chuck construction of copending application Ser. No. 332,656 which became Patent 3,252,710 on May 24, 1966 and is assigned to the assignee of the present invention in which structure substantially similar to that above-described is set forth in greater detail.

Turning now to the portion of the chuck construction 10 more closely related to the present invention, the jaw carriers 17 each support a jaw construction on the forward face thereof. The jaw constructions are indicated at 26, 27 and 28 in FIGURE 1 and are preferably identical. The jaws 26, 27 and 28 each include a generally wedge-shaped central member 31. The central member 31 is fixed for pivotal movement on the forward face of the corresponding jaw carrier 17 by securing means comprising an axially extending locking screw 32. More particularly, the central member 31 is provided with an axially extending countersunk hole 33 therethrough which is centered between the circumferentially spaced side walls thereof and located intermediate the inner and outer ends thereof. The screws 32 extends through hole 33 and is alternatively threadedly reecivable in radially spaced axially extended holes 34, 36 and 37 in the forward wall of the jaw carrier 17. In normal use, the central members 31 are arranged so that the screws 32 thereof engage corresponding ones of the threaded holes 34, 36 and 37 whereby the jaws 26, 27 and 28 will be identically positioned radially of their corresponding jaw carriers 17. However, to conveniently illustrate the different possible locations of the jaws on the jaw carriers, the jaws 26, 27 and 28 are located in FIGURE 1 so that the screws 32 thereof engage successively outwardly spaced ones of the threaded holes in the jaw carriers 17.

In the particular embodiment shown, the locking screw 32 (FIGURE 2) is provided with a central bore 38 extending from the forward end thereof. The rearward end of bore 38 is threaded and is intersected by a radial passage 39 at a point normally disposed well within the corresponding one of the threaded holes in the carrier 17, here hole 37. A plurality of balls 41, preferably of a relatively soft material such as lead are snugly disposed in the radial passage 39 and the rearward end of the central bore 38. A set screw 42 is threadable rearwardly along the opening 38 for forcing the balls 41 radially outwardly along the radial passage 39 and against the opposed threads of the corresponding hole (here hole 37 in FIGURE 2) to prevent unintended loosening of the screw 32.

In the particular embodiment shown, the central member 31 of each of the jaws has a radial front wall 44 at the radially outer end of which is provided a forwardly extending shoulder 46. The periphery of the central member 31 and the radially inner wall of the shoulder 46 are preferably curved in a concentric manner, the curvature of the periphery preferably being similar to that of the periphery of the chuck body. The side walls 48 of the central members 31 converge toward the center of the chuck body defining, in the particular embodiment shown, an included angle of approximately 50°.

A pair of generally rectangular work-engaging members or shoes 51 and 52 are provided on opposite sides of each of the central members 31. The opposed walls 48 and 53 of the central member and shoes, respectively, are provided with axially extending, evenly spaced teeth generally indicated at 54 which are interengageable with each other to prevent sliding motion of the shoes 51 and 52 along the side walls 48 of the central member 31. The shoes 51 and 52 are secured to the side walls of the central member 31 by screws 56. The screws 56 extend parallel to the front wall 12 of the chuck body 11. Each of the side walls of the central members 31 is provided with a threaded hole 57 for threadedly receiving the corresponding one of the screws 56. The shoes 51 and 52 are each provided with a slot 58 through which the screw 56 extends, the slot 58 paralleling the chuck body front wall 12 and extending along the toothed wall 53 of the shoe at right angles to the teeth 54. Thus, by loosening the screw 56 sufficiently, the shoe 51 or 52 may be moved away from the side wall 48 of the adjacent central member 31 sufficiently that the corresponding teeth 54 of the central member and shoe clear each other whereafter the shoe may be moved along the side wall 48 of the central member as permitted by the length of the slot 58 either inwardly or outwardly to a new location on the central member. Thereafter, the shoe may be moved inwardly toward and against the central member 31 so that the teeth 54 intermesh. Tightening of the screw 56 thereafter secures the shoe in its new location on the central member.

The pitch of the teeth 54 is preferably substantially less than the center to center spacing of the threaded holes 34, 36 and 37 in the jaw carrier 17 and is also preferably a fraction of the travel of the jaw carrier resulting from reciprocation of the draw bar head 19. Moreover, the range of relative movement of the screw 56 and slot 58 preferably substantially exceeds the center line spacing of adjacent ones of the threaded holes 34, 36 and 37 in the jaw carrier 17. Thus, the range through which the shoes 51 and 52 can be adjusted on the central member 31, when the central member is located at one of the threaded holes 34, 36 and 37, will overlap the shoe-central member adjustment range with the central member at an adjacent one of said threaded holes. Consequently without moving the carrier 17, the shoes 51 and 52 can each assume any one of a relatively wide range of positions spaced at tooth pitch intervals from an outermost position in which the shoe is at its outward limit on the central member and the central member is at the outermost one 34 of the threaded openings in the carrier 17 to an innermost position in which the shoe is at its inward limit on the central member and the central member is fixed at the innermost one 37 of the threaded holes in the carrier 17. Moreover, since the travel of the carrier 17 in response to limiting travel of the draw bar head 19 preferably equals or exceeds a multiple of the pitch of the teeth 54, the shoes 51 and 52 can be moved, through actuation of the draw bar head 19 continuously between such positions of adjustment and can thereby reach any point within the afore-mentioned range. The shoes can, of course, exceed said range by the length of travel of the carrier 17.

In the particular embodiment shown, the tooth pitch is about ¼ inch, the carrier travel is about ½ inch, the center lines distance between threaded holes 34, 36 and 37 is about 1½ inch and the possible adjustment of the shoes on the central member was about 1⅛ inch.

The side walls 48 of the central member 31 are each provided with a keyway 59 (FIGURES 1, 3 and 4) which extends through the length of such wall intermediate the forward and rearward edges thereof. The toothed walls 53 of the shoes 51 and 52 are each provided with a longitudinally aligned pair of short keyways 61 and 62 (FIGURES 1, 4 and 5) preferably of the same width as the keyway 59 and opposing same when the shoes are secured to the central member 31 by the screw 56. The inner ends of the keyways 61 and 62 are preferably spaced from each other. The keyways 61 and 62 are preferably longitudinally aligned with the slot 58. Keys 63 and 64 of relatively short extent are snugly disposed within the keys 61 and 62 at the outer ends thereof and are affixed to the shoes preferably by countersunk screws 66. The keys 63 and 64 extend outwardly from the keyways 61 and 62 snugly but slideably into the keyway 59 in the adjacent face of the central member 31 to prevent pivotal movement of the shoe about the axis of the screw 56.

In the particular embodiment shown, the shoes 51 and 52 are each provided with a forwardly extending, substantially rectangular shoulder 67 corresponding generally to the shoulder 46 of the central member 31, which shoulder 67 is located at the radially outer end of the shoe. The inner face of the shoulder 67 is preferably grooved as generally indicated at 68 in a conventional manner to provide a nonskid workpiece-engaging face 69. In the particular embodiment shown, the inner end of each of the shoes 51 and 52 is bevelled as indicated at 71 to enable the jaws 26, 27 and 28 to move inwardly to a further extent before the adjacent corners of shoes of adjacent jaws interfere with each other. The inwardmost and outwardmost positions of the shoes are indicated in broken lines at I and O, respectively, in FIGURE 1.

*Operation*

Although the operation of the chuck construction 10 embodying the invention has been indicated for the most part above, same will now be briefly reviewed to insure a complete understanding of the invention.

When a particular workpiece, not shown, is to be chucked, which workpiece differs substantially in diameter from one previously chucked, the movement of the work-engaging faces 69 required to bring same into contact with the workpiece may exceed the range of jaw movement obtainable as a result of draw bar head actuation. In such case, it becomes necessary to manually adjust the location of the work-engaging faces 69 radially with respect to the corresponding jaw carriers 17. When the adjustment to be made is relatively large, for example, of the order of magnitude of the center line spacing of threaded holes 34, 36 and 37 in the carrier 17, a gross relocation of the work-engaging surfaces 69 by repositioning of the central members 31 on the carriers 17 may be required. Such is readily carried out for each jaw by unthreading the screw 32, for example, from the hole 37 in the carrier 17, relocating such screw and with it the jaw and then threading the screw into another one of the threaded holes, for example hole 34, in the carrier 17. In the particular embodiment shown, loosening of the screw 32 is preferably preceded by loosening of the set screw 42, thereby relieving at least some of the pressure between the balls 39 and the threads of the hole 37. Conversely, upon tightening of the screw 32, the set screw 42 is preferably retightened to prevent inadvertent loosening of the screw 32. With the screw 22 thus secured, the jaw is snugly but pivotally affixed to the carrier 17. The gross adjustment above described is normally carried out on all of the jaws, so that the jaws are pivotally fixed with respect to the axis of corresponding ones of the jaw carrier holes, in the above example, the outermost hole 34.

Under certain circumstances a finer adjustment of the radial position of the work-engaging surfaces 69 with respect to the carriers 17 may be required. For example, such a fine adjustment may be required following a gross adjustment as above described wherein the positions obtainable by the work-engaging surface 69 through reciprocation of the draw bar head 19 still do not bring the work-engaging surfaces to the proper position for engaging a workpiece. On the other hand, such a fine adjustment may be required without any gross adjustment when the shift in workpiece size is relatively small but is sufficient to require a shift in the location of the work-engaging faces 69 beyond that obtainable by reciprocation of the draw bar head 19. Such a fine adjustment of the position of the work-engaging faces 69 is carried out by repositioning the shoes 51 and 52 radially on the respective carriers 31. More particularly, such fine adjustment is made to each shoe by loosening the screw 56 sufficiently to allow the teeth 54 in the opposed faces 48 and 53 of the central member and shoe, respectively, to disengage, whereafter the shoe is slid along the opposed face of the central member to the desired new location, such sliding motion being allowed by clearance of the shank of the screw 56 from the end walls of the slot 58. The shoe is prevented from cocking about the axis of the screw 56 during such sliding motion by the sliding fit of the keys 63 and 64 in the keyway 59 of the central member 31. The shoe is then moved toward the central member, the teeth 54 thereof interlocking once again and the screw 56 is tightened to rigidly affix the shoe to the central member. Again, the shoes are normally all adjusted to the same radial position on their respective central members 31.

Once the proper gross and fine adjustments are made as required, the workpiece may be rested against the forward walls 44 of the central member 31 as well as against the corresponding forward walls of the shoes 51 and 52 within the radial confines of the shoulders 46 and 67. Thereafter, the draw bar may be pulled rearwardly to draw in carriers 17 in an even manner so as to bring the work-engaging surfaces 69 into engagement with the workpiece. The shoes 51 will normally be sufficiently inwardly disposed upon the center members 31 that the workpieces will be engaged by such work-engaging faces 69 prior to engagement thereof by the shoulder 46 on each of the central members. Thus, it will be seen that the workpiece is not engaged by only three work-engaging surfaces as in conventional three-jawed chucks but rather is engaged by six work-engaging faces, two to each jaw. As a result of the relatively wide circumferential spacing between the work-engaging surfaces of the shoes of each jaw, the jaw tends to center the workpiece in a highly stable manner as the work-engaging surfaces thereof move into gripping engagement with the workpiece. Thus, there is no tendency for the jaw to twist away from the workpiece as has been found in certain previous chucks with single screw mounted jaws.

If desired, suitable abutments, not shown, may be affixed to the front face 12 of the chuck body 11 as by use of radial undercut keyways 73 therein in a conventional manner to provide an axial abutment for the workpiece.

*Modification*

FIGURES 6 through 9 disclose various means for changing the texture and location of the work-engaging face without modification to the shoe. Turning first to FIGURE 6, the shoe 52 is here provided with a work-engaging block 76. The block is substantially rectangular and is provided with a planar work-engaging face 77 which is spaced inwardly of the chuck from the face 69. The block 77 is preferably equal in width to the face 69. In the particular embodiment shown, the block 76 is provided with an outwardly extending lip 78 which extends into a groove 79 in the rearward portion of the face 69 to assist in positively locating the block 76 on the shoe 52. An axially extending screw 81, indicated in broken lines, extends through a countersunk opening 82 in the block 76 into threaded engagement, as indicated at 83, with the forward face of the shoe 52. In addition, a substantially radially extending screw 84 extends into and through a countersunk opening 86 in the shoulder 67 and into threaded engagement as indicated at 87 with the outer face of the block 76. The block 76 extends the work-engaging face substantially further inwardly on the jaw. Further, the smooth work-engaging face 77 here provided thereon may be desirable under certain conditions, such as to avoid marring of a polished workpiece surface.

Turning to FIGURE 7, a similar block 76A is fixed against the face 69 by a suitable screw 84A, the block 76A being substantially less deep than the block 76 and having a toothed radially inner face 77A of a type particularly suitable for gripping rough-surfaced workpieces such as cast iron workpieces and the like. Thus, addition of the block 76A serves to change the texture of the work-engaging face without substantially changing the location thereof.

FIGURE 9 discloses a further block 76B which is affixed to the shoe 52 in a manner substantially similar to that discussed hereinabove with respect to FIGURE 6. The block 76B, however, is provided with a forwardly extending shoulder 88 which provides a workpiece-engaging face 77B which is displaced forwardly as well as inwardly from the face 69 of the shoe 52.

Thus, it will be seen that all of the shoes of the jaws 26, 27 and 28 may be provided with suitable and identical blocks, such as, for example, the block 76, 76A or 76B above discussed in order to enable the chuck construction 10 to grip workpieces lying in a different range of diameters than it would normally be able to grip or workpieces having substantially differing surface textures, hardness and so forth requiring different work-engaging surface configurations.

FIGURE 10 discloses a further modification in which shoes 51C and 52C, substantially similar to the shoes 51 and 52 above discussed, are provided but are reversed in orientation so that the shoulders 67C thereof are innermost and the bevels 71C are outermost. The ends of the shoes 51C and 52C bearing the shoulders 67C are bevelled at 89 in a manner substantially similar to bevels 71C. Bevels 89 are provided for the same purpose as the bevels 71 above discussed, i.e., to allow the jaws to move closer to the chuck center without interference. The shouldered ends 67C of the shoes 51C and 52C provide work-engaging faces indicated at 91.

The shoes 51C and 52C may be reversed on the central member 31 by removal of screws 56 threfrom. The shoes are then interchanged with each other and rotated through roughly 180° in a plane parallel to chuck face 12 so that the ends thereof bearing bevels 71C point inwardly toward the center of the chuck and the shouldered ends thereof point outwardly, i.e., so that the shoe lie in the same orientation as shoes 51 and 52 of FIGURE 1. The shoes 51C and 52C are then affixed to the member 31 to complete the reversal procedure. Such procedure can, of course, be carried out in reverse to return shoes 51C and 52C to their FIGURE 10 positions. When the shoes 51C and 52C are in their orientation shown in FIGURE 10, the work-engaging faces 91 presented to the workpiece are located substantially further inwardly of the chuck body than is the case when the shoes are oriented as in FIGURE 1, assuming the same location of such shoes relative to the center of the chuck. Thus, providing shoes bevelled at both ends, as are the shoes 51C and 52C, and reversible on the central member 31 allows a substantial increase in the range of workpiece diameters which can be gripped, such range of workpiece diameters thus being increased inwardly by the distance between the faces 91 and 69C.

It is also contemplated that the outwardly facing one of the work-engaging surfaces may be used for internally gripping a hollow workpiece.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. A chuck construction comprising:
   a chuck body;
   a plurality of jaw carriers mounted on and movable with respect to said chuck body with said jaw carriers having at least a radial component of motion;
   a plurality of members each mounted on a corresponding one of said jaw carriers, each of said members having opposite sidewalls extending substantially radially of said chuck construction;
   adjustable securing means for pivotally securing each of said members to corresponding ones of said jaw carriers, said securing means permitting said members to be pivotally secured to said carriers in a plurality of radially spaced positions;
   a pair of shoes fixed to the opposite sidewalls of each of said members, each of said shoes having a work-engaging surface for gripping a workpiece; and
   adjustable mounting means for fixedly securing each shoe to the adjacent sidewall of its corresponding member, said mounting means permitting said shoes to be moved relative to said members in a substantially radial direction with said shoes being fixedly securable to said members in a plurality of selected radial positions.

2. A chuck construction as defined in claim 1, wherein said securing means permits said members to be pivotally secured to said carriers at a plurality of widely spaced radial positions, and said mounting means permits said shoes to be fixedly secured to said members at a plurality of closely spaced radial positions.

3. A chuck construction as defined in claim 2, wherein said members are substantially wedge-shaped and have sidewalls which converge as they extend inwardly of said chuck body, and said adjustable mounting means including a plurality of evenly spaced, axially extending teeth formed on the sidewalls of said wedge-shaped members and on the opposed walls of each of said shoes with the teeth being interengageable with each other for preventing sliding movement of said shoes along said sidewalls transversely of the axis of said chuck construction.

4. A chuck construction as defined in claim 3, wherein the sidewalls of said members and the opposite faces of said shoes are provided with slideable, elongated key means therebetween for preventing twisting of said shoes relative to said sidewall, said key means extending in a substantially radial direction for permitting said shoes to slideably move radially relative to said members for adjusting the radial position thereof.

5. A chuck construction as defined in claim 2, wherein said sidewalls of said members are each provided with a keyway extending therealong and in which corresponding keyways are located in the opposed face of said shoes and including keys located in such keyways for preventing twisting movement of said shoes relative to said members, and wherein said adjustable mounting means further includes a slot formed in each of said shoes with said slot extending in a direction substantially parallel to the longitudinal extent of the opposed one of said sidewalls of said member and extending through said shoe toward said sidewall and including a screw slideably disposed in said slot and threadedly engaged in said sidewall of said member, said screw being tightenable to affix the shoe to said member and loosenable to allow adjustment of said shoe substantially radially of said chuck construction along said sidewall.

6. A chuck construction as defined in claim 1, in which said adjustable securing means includes a screw cooperating with each of said members and in which each of said carriers is provided with a plurality of substantially radially spaced, axially extending threaded holes for alternately receiving said screw for permitting said member to be pivotally secured to said carrier, and wherein said adjustable mounting means includes a plurality of evenly spaced, axially extending teeth provided on the sidewall of said member and on the opposed walls of each of said shoes with said teeth being interengageable with each other for preventing sliding movement of said shoes along said sidewalls transversely of the axis of said chuck construction, the spacing of said teeth being a small fraction of the spacing of said threaded holes so that adjustment of said shoes with respect to said members over a distance corresponding to the thickness of several teeth will be less than the centerline spacing of said threaded hole.

7. A chuck construction as defined in claim 6, wherein said chuck construction is a drawbar operated power chuck and includes a drawbar axially movable for reciprocating said carriers, the length of travel of said carriers in response to reciprocation of said drawbar being substantially a multiple of the pitch of said teeth.

8. A chuck construction as defined in claim 1, wherein both ends of each of said shoes are bevelled to prevent interference between adjacent shoes located upon different members regardless of which end is arranged to extend inwardly toward the center of the chuck construction, each of said shoes also being provided with two opposite radially spaced, substantially parallel workpiece-gripping surfaces thereon, whereupon reversal in the orientation of said shoes on said members results in the presentation of different workpiece-gripping surfaces whereupon the chuck construction is thus able to accommodate workpieces of substantially different diameters.

References Cited

UNITED STATES PATENTS

| | | | |
|---|---|---|---|
| 1,033,547 | 7/1912 | Cornil | 279—123 X |
| 1,203,152 | 10/1916 | Steudner | 279—123 X |
| 2,896,958 | 7/1959 | Strauss | 279—123 |
| 3,099,457 | 7/1963 | Hohwart et al. | 279—123 X |
| 3,151,862 | 10/1964 | Nicosia | 279—123 |
| 3,219,356 | 11/1965 | Wilterdink et al. | 279—123 |

ROBERT C. RIORDON, *Primary Examiner.*

J. C. PETERS, *Assistant Examiner.*